(12) United States Patent
Brija

(10) Patent No.: US 9,402,284 B1
(45) Date of Patent: Jul. 26, 2016

(54) RECONFIGURABLE INDUCTION COOKTOPS

(75) Inventor: Francis Thomas Brija, Palm Beach Gardens, FL (US)

(73) Assignee: Spring (U.S.A.) Corporation, Naperville, IL (US)

( * ) Notice: Subject to any disclaimer, the term of this patent is extended or adjusted under 35 U.S.C. 154(b) by 1177 days.

(21) Appl. No.: 12/901,106

(22) Filed: Oct. 8, 2010

Related U.S. Application Data

(60) Provisional application No. 61/249,806, filed on Oct. 8, 2009.

(51) Int. Cl.
*H05B 6/12* (2006.01)
*H05B 6/04* (2006.01)

(52) U.S. Cl.
CPC ............... *H05B 6/12* (2013.01); *H05B 6/1245* (2013.01)

(58) Field of Classification Search
CPC .... H05B 6/062; H05B 6/1209; H05B 6/1263; H05B 6/642; H05B 6/1245; H05B 6/1218; H05B 6/12
USPC ............... 219/240, 435, 403, 452.11, 452.12, 219/454.12, 459.1, 451.1, 458.1, 461.1, 219/462.1, 600, 620, 622, 660, 625, 661, 219/623, 624; 126/275 R, 275 E, 19 R; 99/DIG. 14
See application file for complete search history.

(56) References Cited

U.S. PATENT DOCUMENTS

| | | | | |
|---|---|---|---|---|
| 4,661,670 A | * | 4/1987 | Eke | 219/681 |
| 5,446,268 A | * | 8/1995 | Chen | H05B 6/1263 |
| | | | | 219/623 |
| 5,571,434 A | * | 11/1996 | Cavener et al. | 219/452.12 |
| 6,949,723 B2 | * | 9/2005 | Staebler et al. | 219/445.1 |
| 2006/0289489 A1 | * | 12/2006 | Wang | 219/622 |

FOREIGN PATENT DOCUMENTS

| | | | |
|---|---|---|---|
| JP | 60-211233 A | * 10/1985 | |
| JP | 3-11240 A | * 1/1991 | |
| JP | 5-234668 A | * 9/1993 | |
| JP | 2004-103486 A | * 4/2004 | |
| TW | GB 2223093 A | * 3/1990 | H05B 6/1209 |

OTHER PUBLICATIONS

English Translation Miyagawa et al. (JP 5-234668), Sep. 1993.*
Abstract in English Miyagawa et al. (JP 5-234668), Sep. 1993.*
Abstract in English Nakano (JP 3-11240), Jan. 1991.*

* cited by examiner

*Primary Examiner* — Hung D Nguyen
(74) *Attorney, Agent, or Firm* — Banner & Witcoff, Ltd.

(57) ABSTRACT

An induction cooktop may be reconfigured to be used as a built-in side-by-side warmer model, a built-in front-back warmer model, a countertop side-by-side warmer model, and a countertop front-back warmer model. The cooktop may include a housing with two warmers and a control panel for supplying power to the warmers. The control panel may be detached from one side of the cooktop and reattached to another side, thereby reconfiguring the cooktop from a side-by-side warmer model to a front-back warmer model. The inclusion of a ledge around the periphery of the housing may allow the cooktop to be used as both a built-in model and a countertop model.

12 Claims, 18 Drawing Sheets

RECONFIGURABLE INDUCTION COOKTOPS

CROSS REFERENCE TO RELATED APPLICATIONS

This application claims priority to U.S. provisional application with Ser. No. 61/249,806, entitled "Reconfigurable Induction Cooktops" and filed Oct. 8, 2009, the entire disclosure of which is herein incorporated by reference.

BACKGROUND

Induction cooking ranges have been used for heating food items in pots and pans. With these cookers, a coil of copper wire is generally placed underneath the cooking pot. A current through the copper wire then induces a magnetic field which generates heat. Induction cookers are faster and more energy-efficient than traditional cooktops. Unlike traditional cooktops, the pot itself is heated to the desired temperature rather than heating the stovetop. Since only the pot is heated, the potential for injury is reduced.

While induction cookers are generally more expensive than electric cooktops, induction cookers are becoming more popular because of their higher efficiency and the safety features associated with them. They come in various models and configurations, including countertop and built-in models in dual or single warmer configurations. As the name implies, countertop models are used while sitting on top of a counter while built-in models are generally dropped into a countertop before use.

The dual warmer induction cooktop generally comes in two subconfigurations, one with the two warmers located side-by-side and the other with the warmers located in a front-back location relative to one another. Moreover, these two cooktop subconfigurations can come in the countertop or built-in model.

In addition, for the dual warmer configuration, the control panel for supplying power to the warmers may be located on either the short side or the long side of the unit, depending on whether the two warmers are meant to be used in the side-by-side or front-back subconfigurations.

The four possibilities of dual warmer induction cooktops (built-in side-by-side, built-in front-back, countertop side-by-side, and countertop front-back) are generally customized and sold as four different options depending on a customer's specific needs and taste. The need for the assembly of four different models to serve customers forces manufacturers of dual warmer induction cooktops to maintain multiple toolsets and stock keeping units (SKUs).

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present disclosure are directed to a reconfigurable induction cooktop that may be used as either a countertop or built-in cooktop.

Other aspects of the present disclosure are directed to a reconfigurable induction cooktop that may be used as either a side-by-side or front-back cooktop. In reconfiguring the cooktop in this way, the control box used to power the induction warmers may be detached from one side of the cooktop and attached to another side.

Still other aspects of the present disclosure are directed to a reconfigurable induction cooktop that may be reconfigured simultaneously on the built-in or countertop variable and on the front-back or side-by-side variable.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

Figure 1:
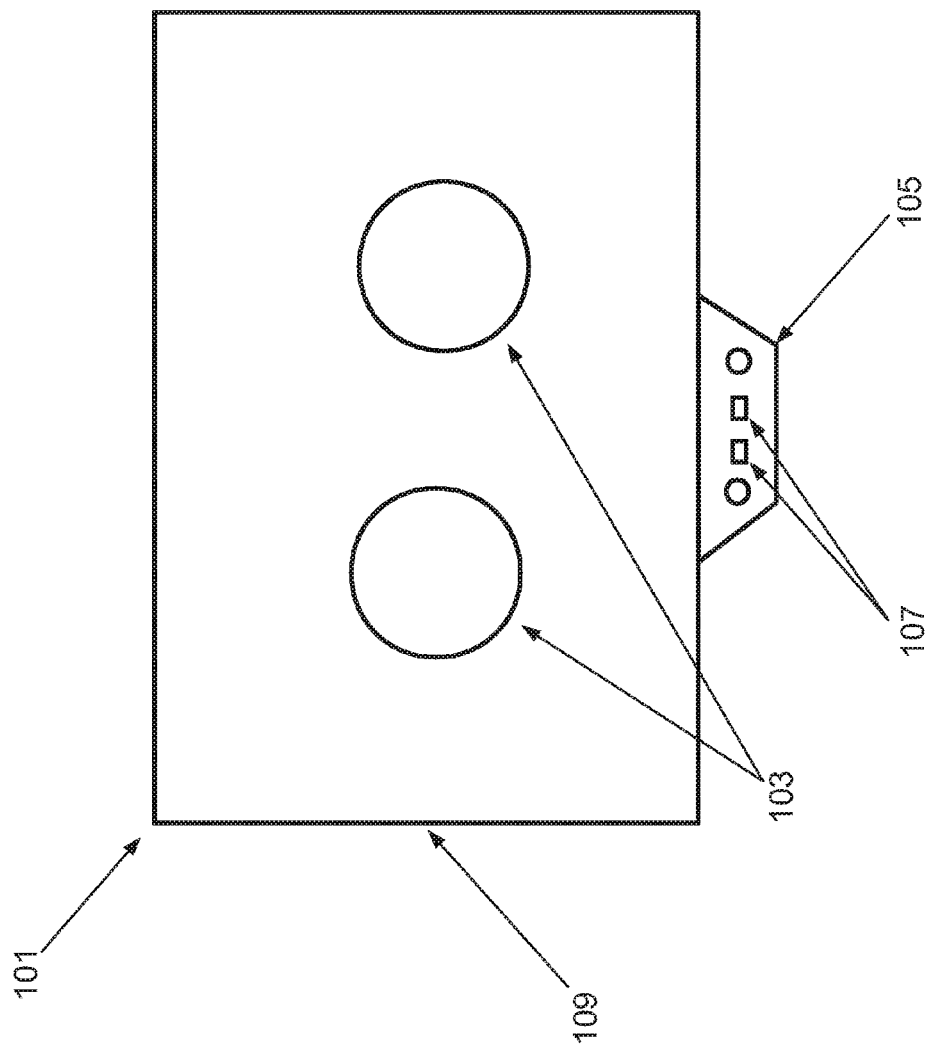
FIG. 1 illustrates a top down view of an induction cooktop with side-by-side warmers in accordance with certain aspects of the present disclosure.

FIG. 1 illustrates a top down view of an induction cooktop with side-by-side warmers in accordance with at least one aspect of the present disclosure. The side-by-side warmer induction cooktop 101 includes side-by-side warmers 103 and control box 105. Side-by-side warmers 103 may be any size and shape, including rectangular, square, and triangular.

Side-by-side warmers 103 may be powered by the control box 105. In addition, control box 105 may include a display 107 showing the power level applied to each of the warmers 103. The display 107 in control box 105 may also display other information, including the temperature of the warmers, time, and date, among other things.

Figure 2:
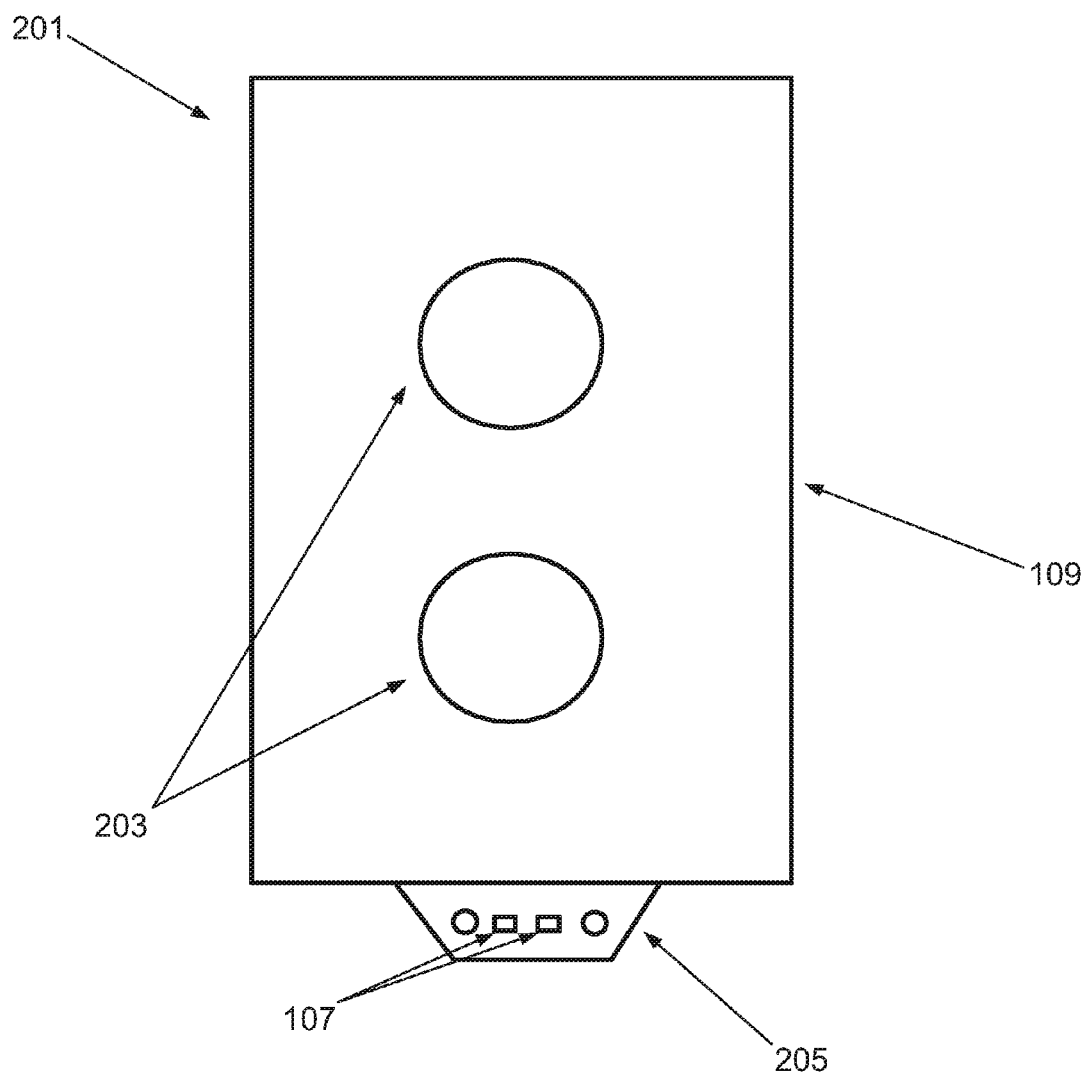
FIG. 2 is a top down view of an induction cooktop with front-back warmers in accordance with certain aspects of the present disclosure.

FIG. 2 illustrates a top down view of an induction cooktop with front-back warmers in accordance with at least one aspect of the present disclosure. The front-back warmer induction cooktop 201 includes front-back warmers 203 and control box 205. Front-back warmers 203 may be any size and shape, including rectangular, square, and triangular.

In accordance with an aspect of the disclosure, the front-back warmer cooktop 201 may be made by detaching control panel 105 from the long side of cooktop 101 and reattaching the control panel 105 to the short side of cooktop 101. Alternatively, cooktop 101 may be made by detaching control panel 205 from the short side of cooktop 201 and reattaching the control panel 205 to the long side of cooktop 201.

The control panels 105 or 205 may be detached from the cooktops 101 or 201 by any number of means, including the removal of screws, adhesive, or other fastening means. When control panel 105/205 is detached from the main assembly, a cover panel 109 may be removed from the alternate location of the control panel 105/205 and placed on top of the location where the control panel 105/205 was just removed. In this way, the control panel may be seamlessly exchanged from one location to another to convert cooktops 101 and/or 201 into a side-by-side or front-back configuration.

Figure 3:
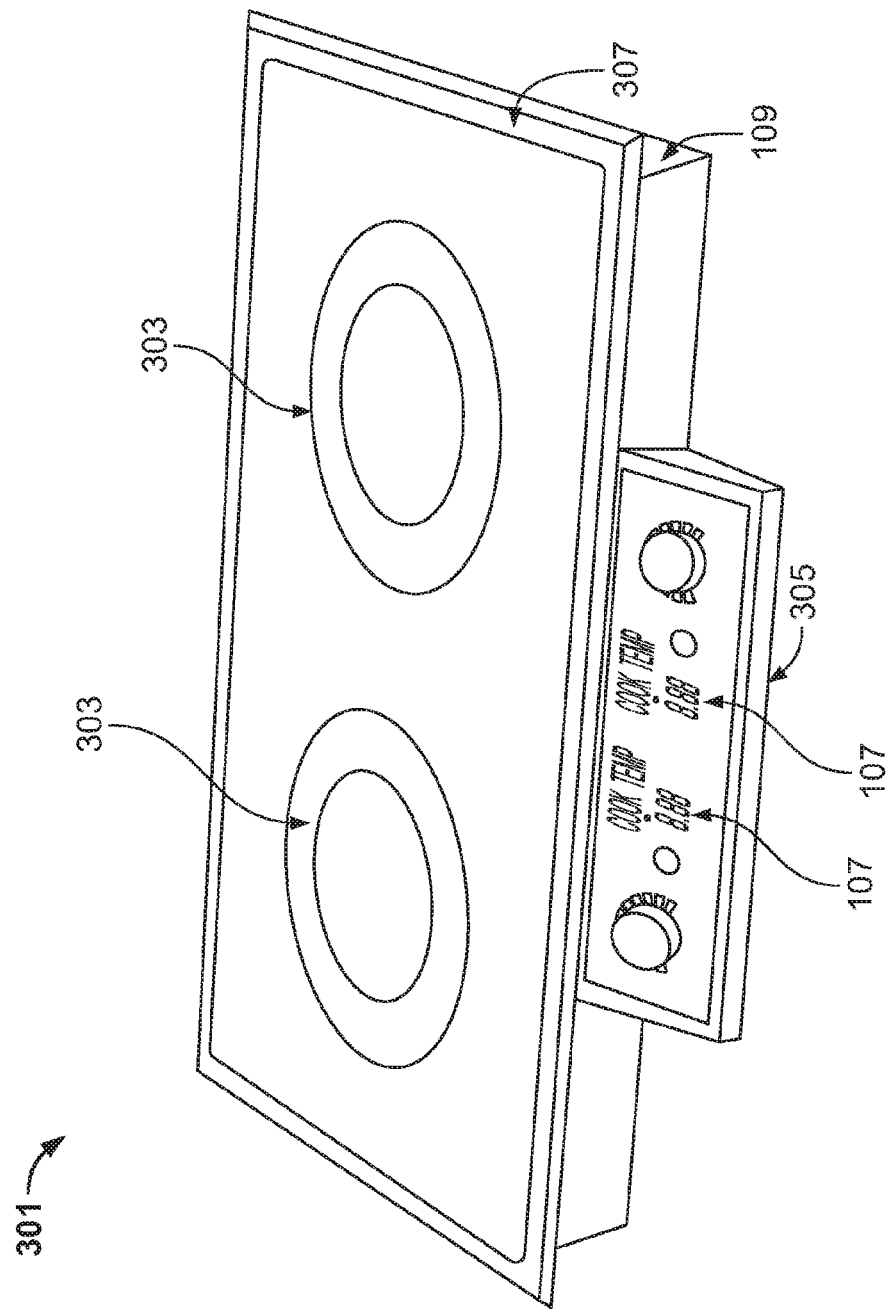
FIG. 3 shows a perspective view of an induction cooktop with side-by-side warmers in accordance with certain aspects of the present disclosure.
Figure 4:
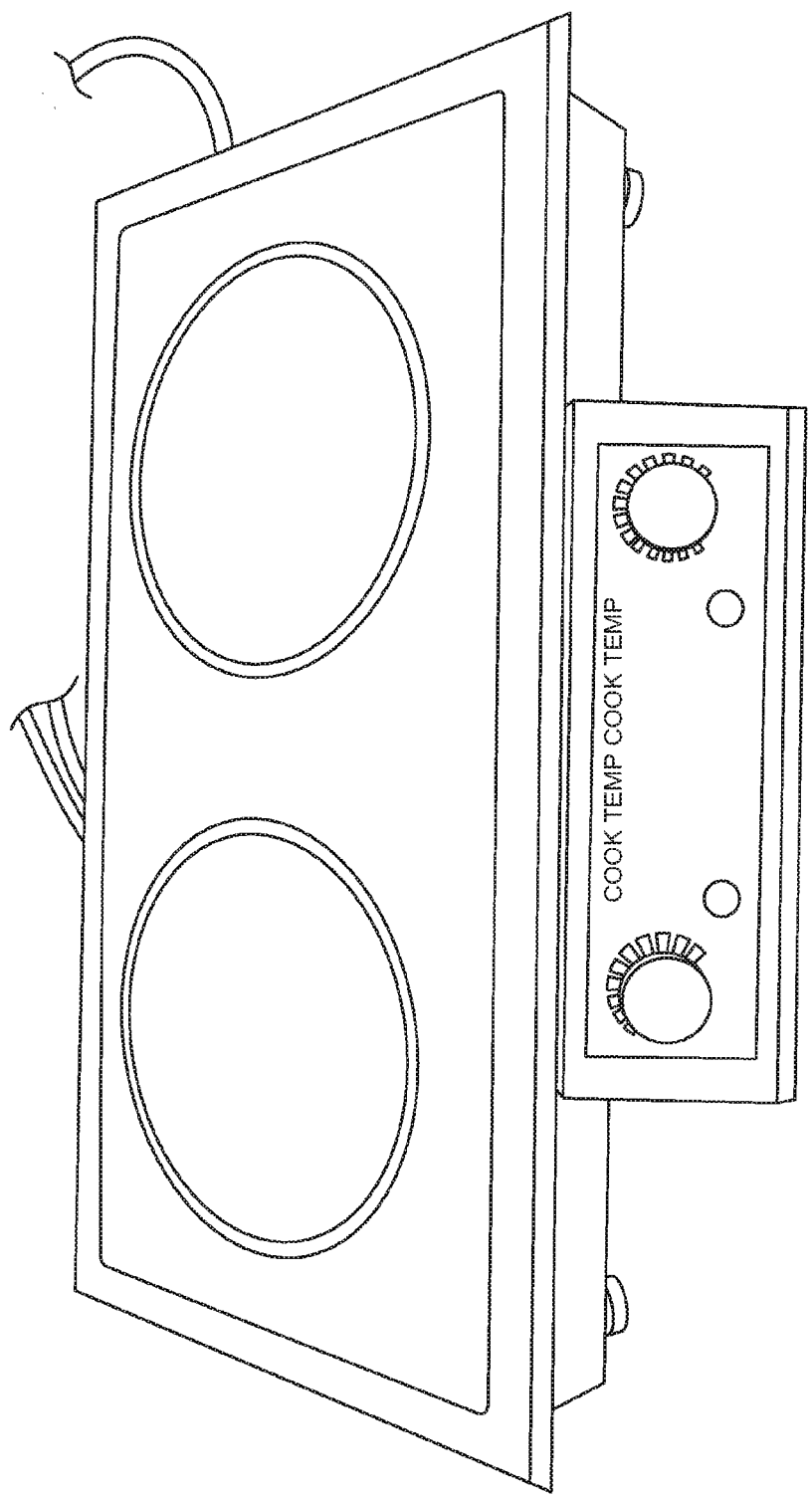
FIG. 4 shows a top down view picture of a first embodiment of an induction cooktop with side-by-side warmers in accordance with certain aspects of the present disclosure.
Figure 5:
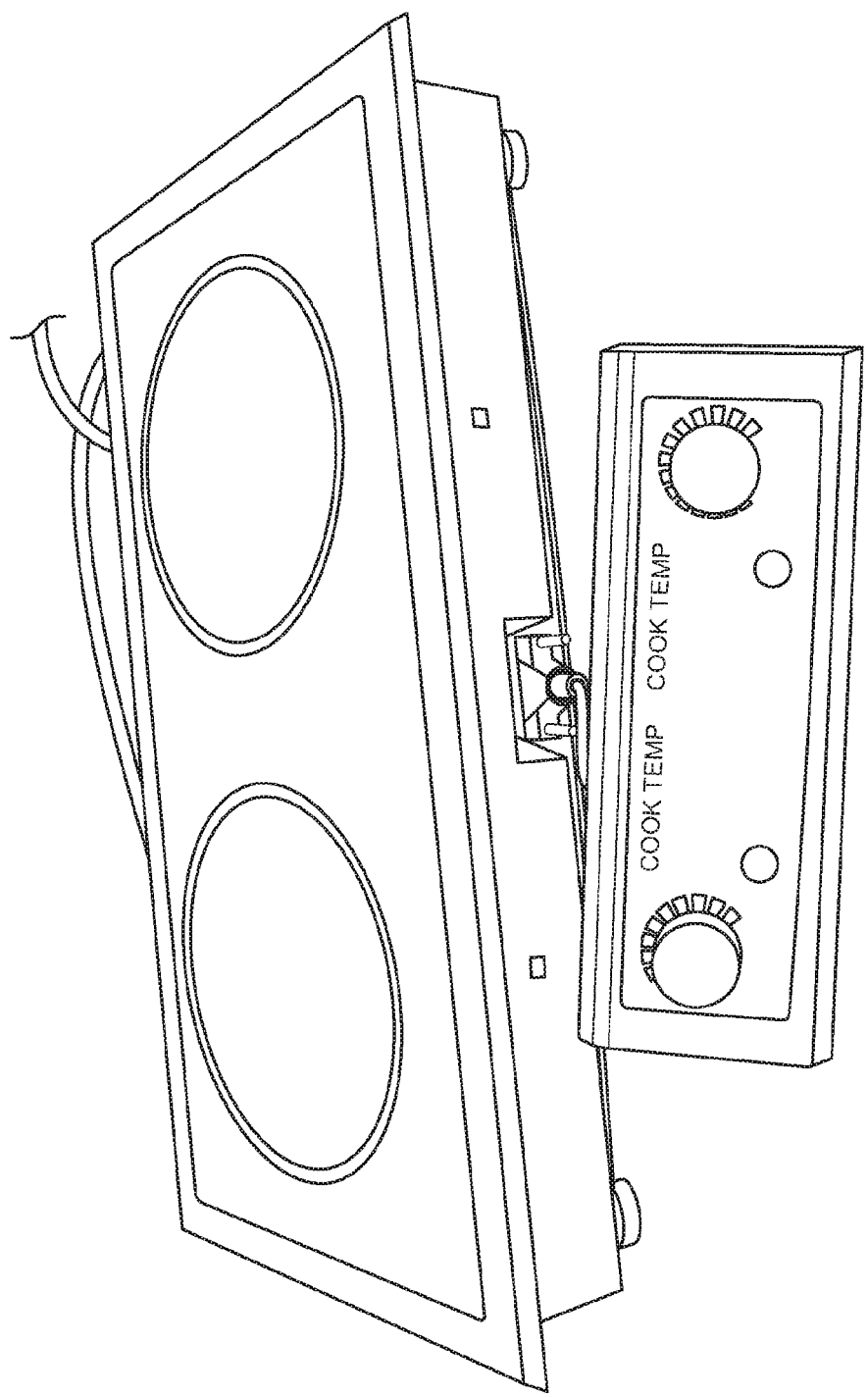
FIG. 5 shows a perspective view picture of a first embodiment of an induction cooktop with side-by-side warmers in accordance with certain aspects of the present disclosure.
Figure 6:
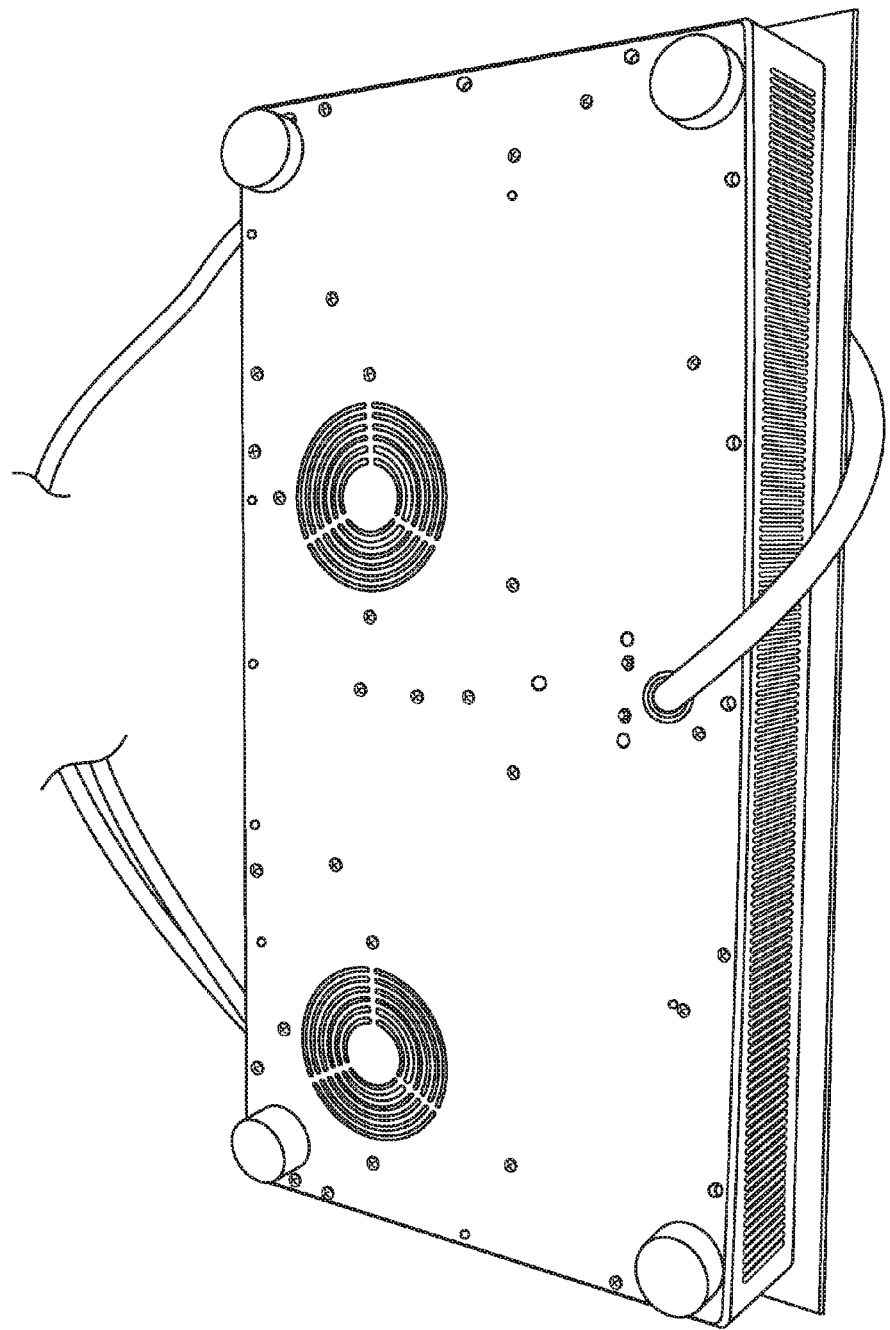
FIG. 6 shows a bottom view picture of a first embodiment of an induction cooktop with side-by-side warmers in accordance with certain aspects of the present disclosure.
Figure 7:
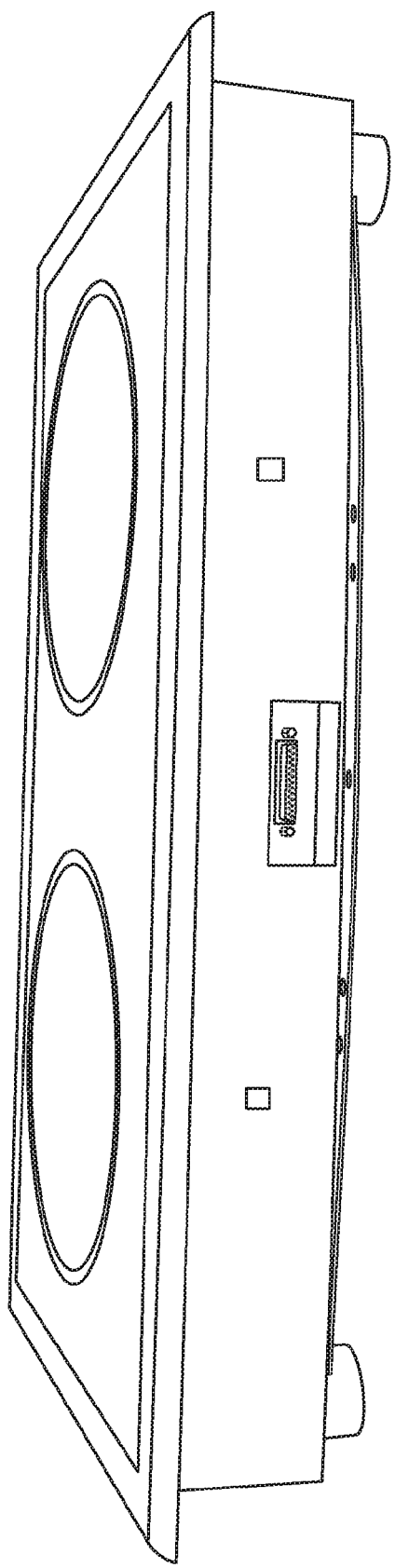
FIG. 7 shows a front view picture of a first embodiment of an induction cooktop with side-by-side warmers in accordance with certain aspects of the present disclosure.
Figure 8:
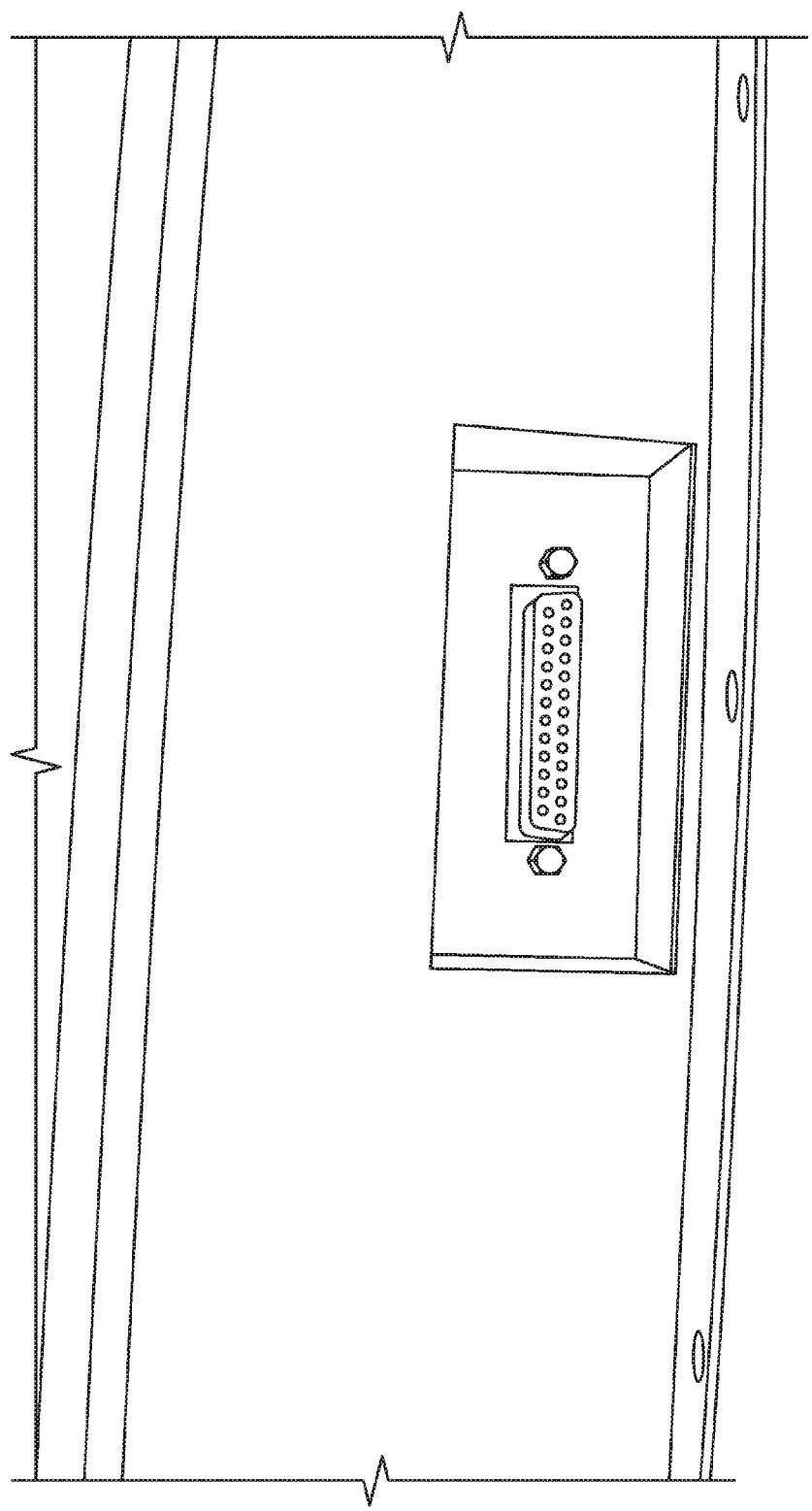
FIG. 8 shows a front view picture of a first embodiment of an induction cooktop with side-by-side warmers zoomed into the port for plugging in the control panel in accordance with certain aspects of the present disclosure.
Figure 9:
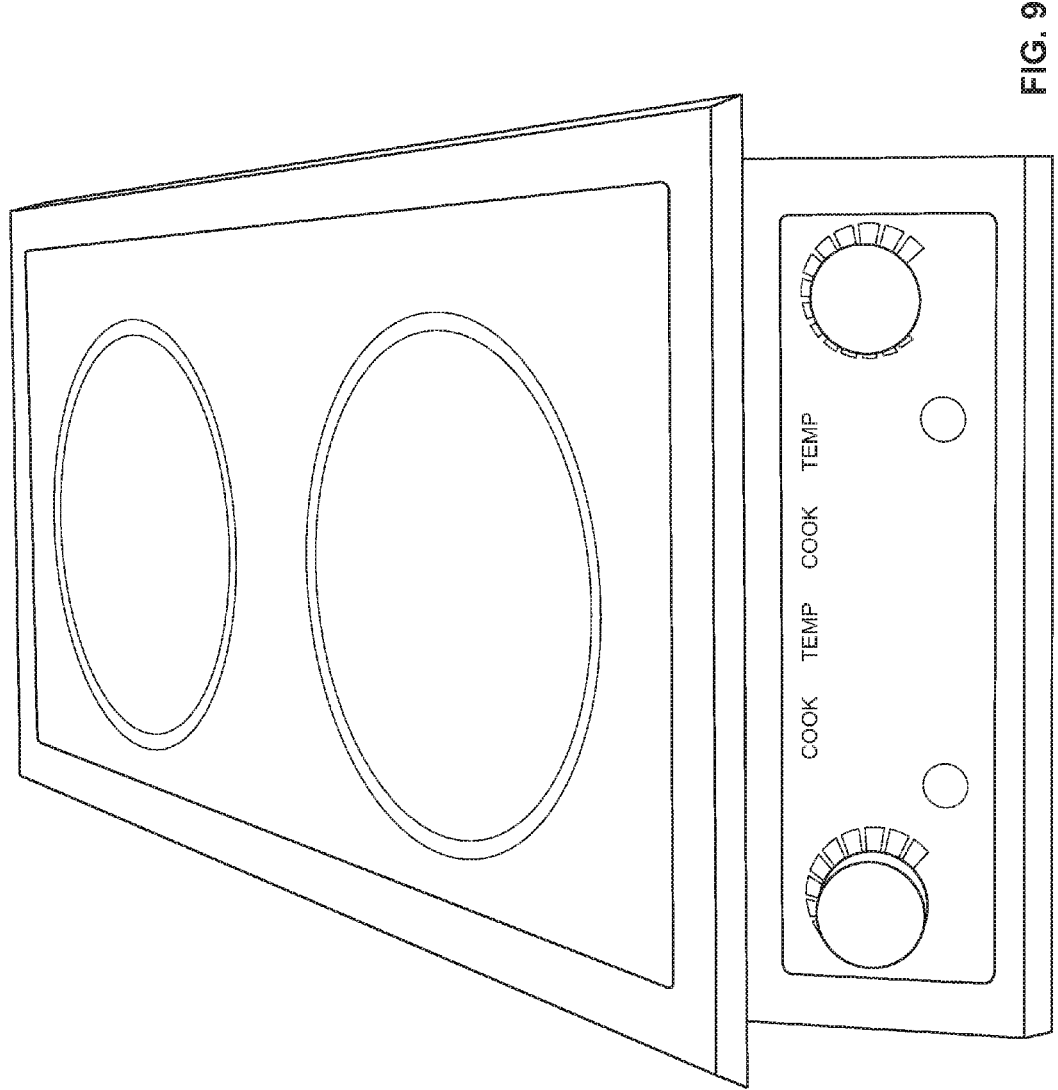
FIG. 9 shows a top down view picture of a first embodiment of an induction cooktop with front-back warmers in accordance with certain aspects of the present disclosure.
Figure 10:
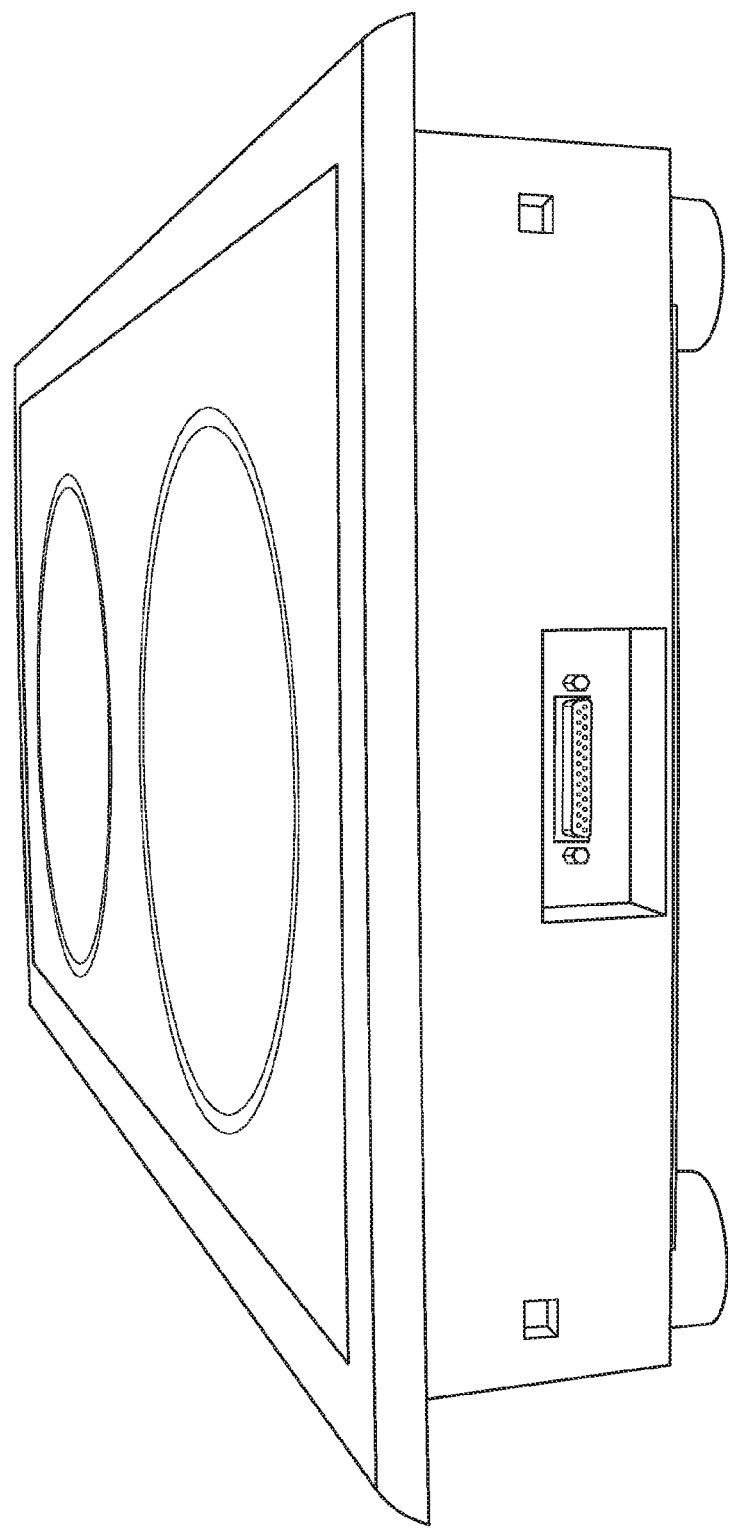
FIG. 10 shows a front view picture of a first embodiment of an induction cooktop with front-back warmers in accordance with certain aspects of the present disclosure.
Figure 11:
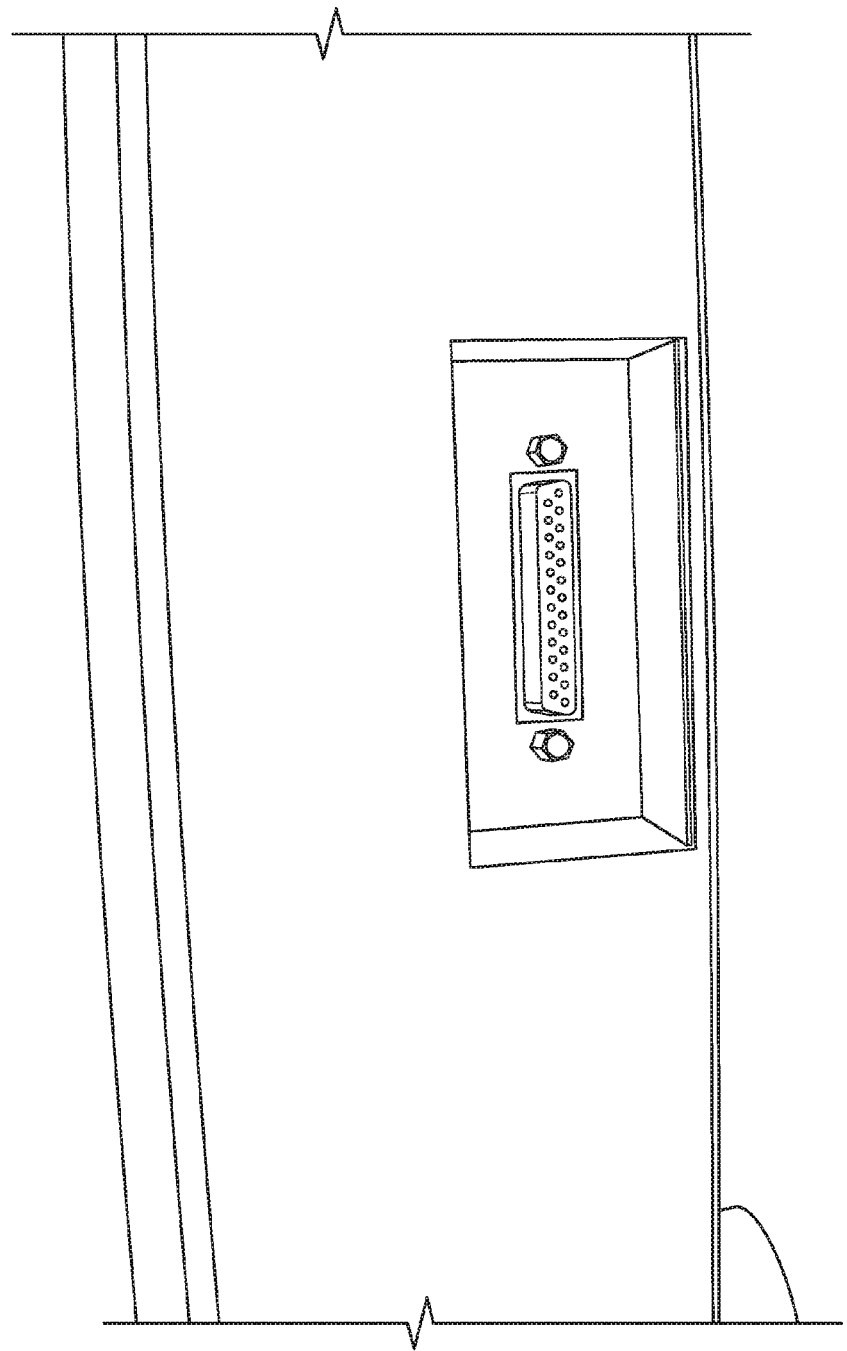
FIG. 11 shows a front view picture of a first embodiment of an induction cooktop with front-back warmers zoomed into the port for plugging in the control panel in accordance with certain aspects of the present disclosure.
Figure 12:
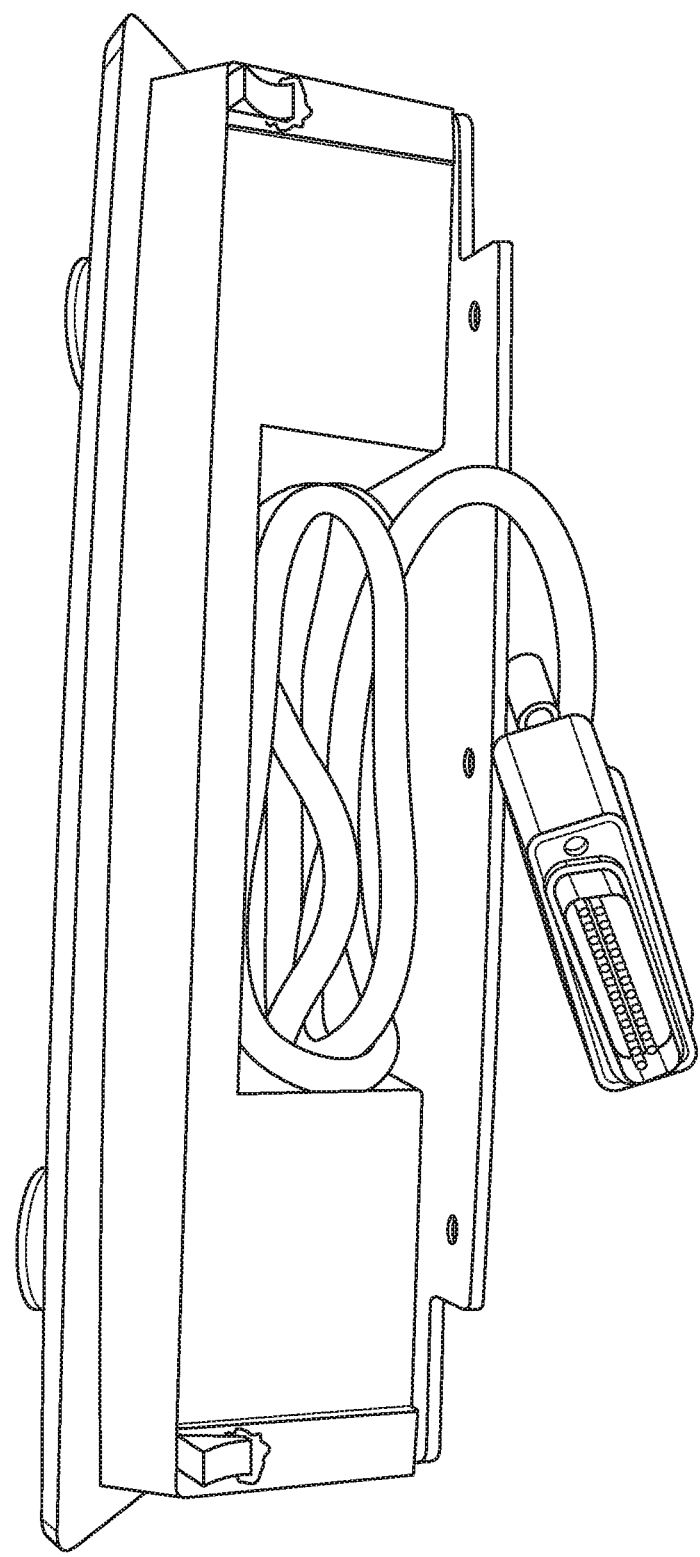
FIG. 12 shows a back view picture of a first embodiment of a control panel with the wire and plug for plugging into a cooktop in accordance with certain aspects of the present disclosure.
Figure 13:
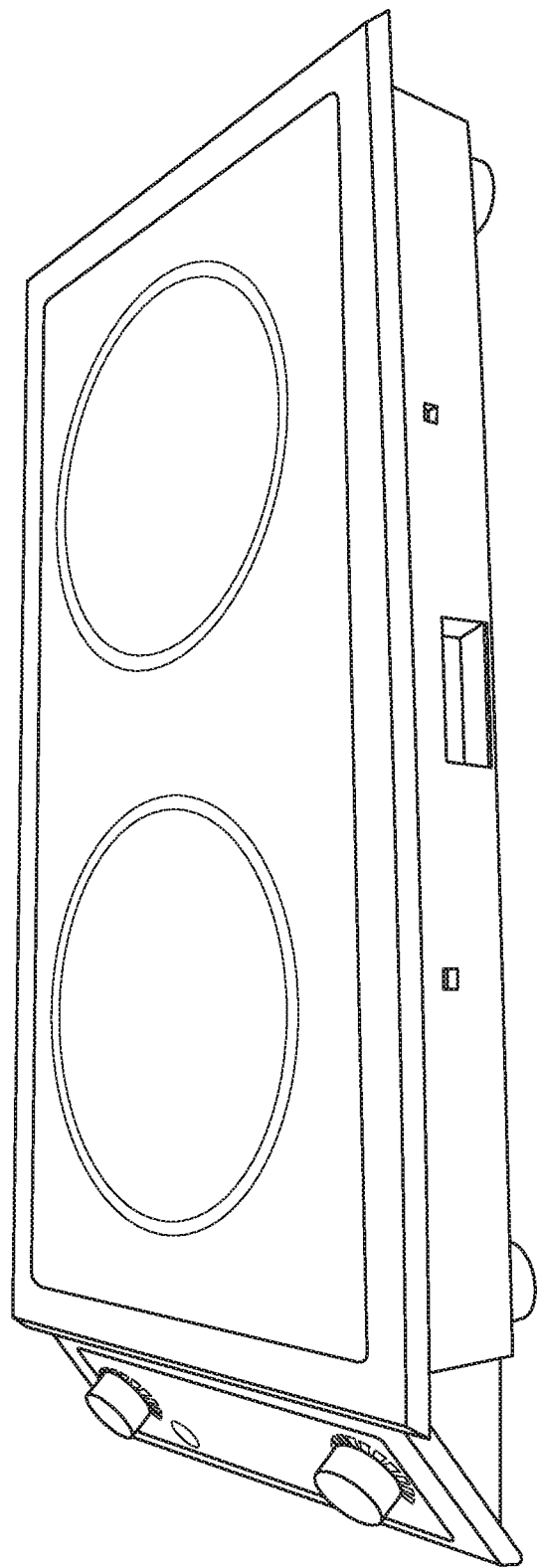
FIG. 13 shows a side view picture of a first embodiment an induction cooktop with front-back warmers in accordance with certain aspects of the present disclosure.
Figure 14:
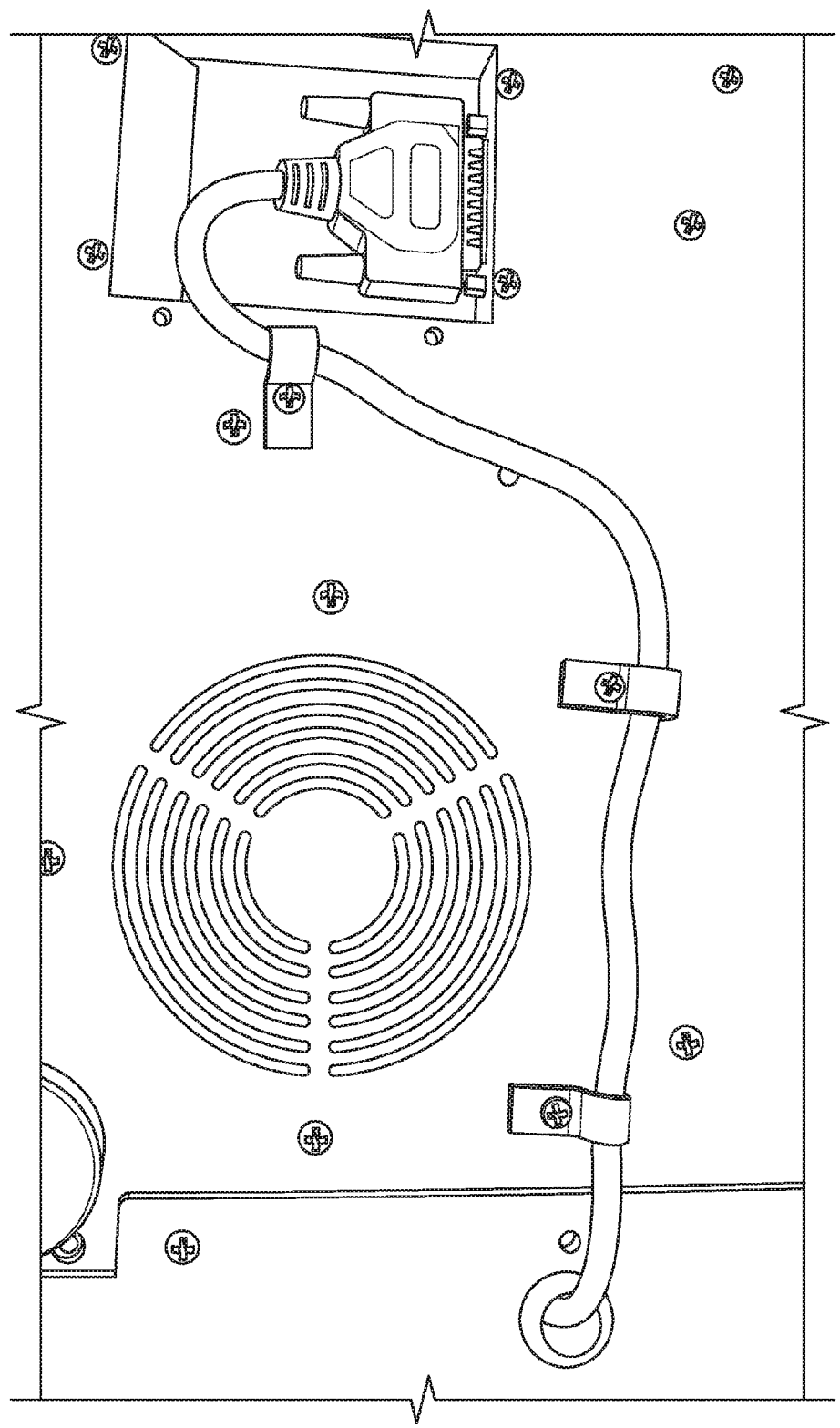
FIG. 14 shows a bottom view picture of a second embodiment of an induction cooktop with front-back warmers in accordance with certain aspects of the present disclosure.
Figure 15:
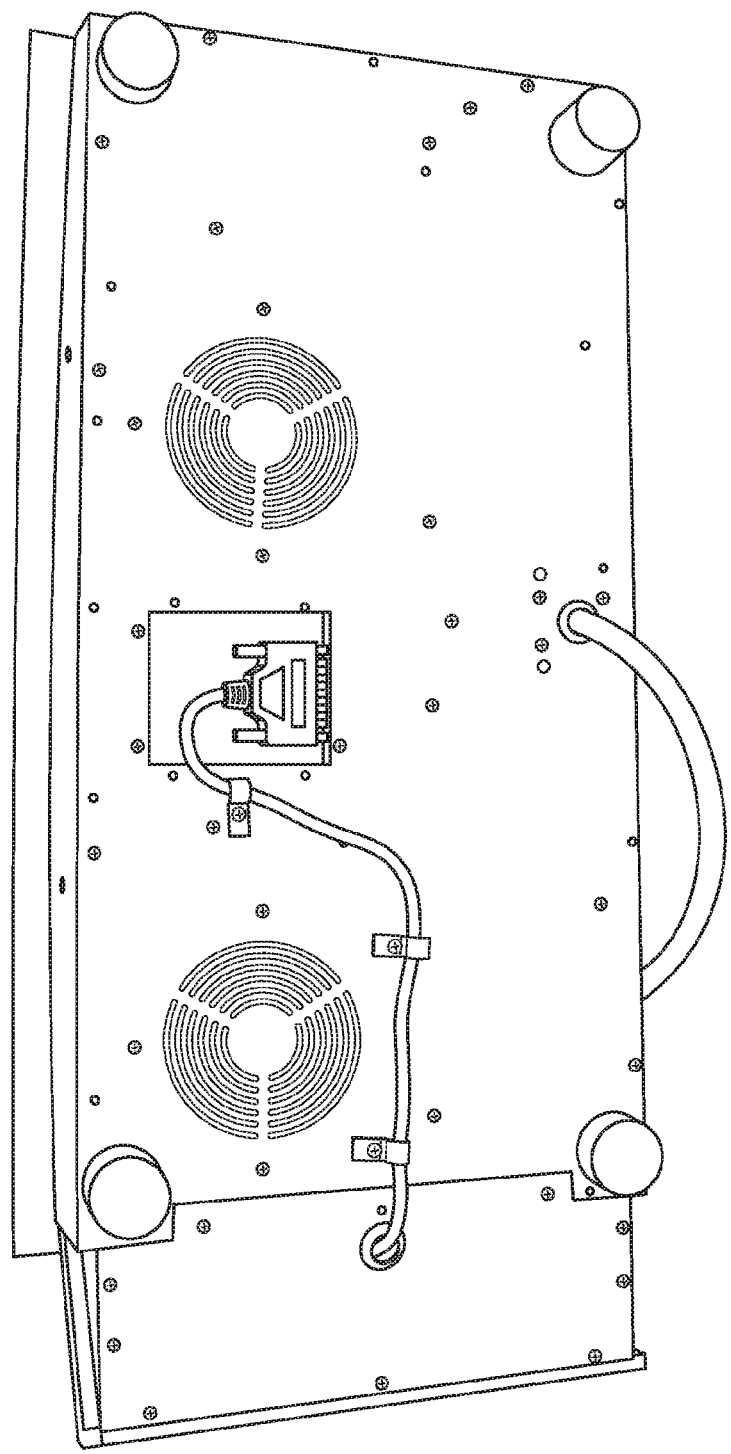
FIG. 15 shows another bottom view picture of a second embodiment of an induction cooktop with front-back warmers in accordance with certain aspects of the present disclosure.
Figure 16:
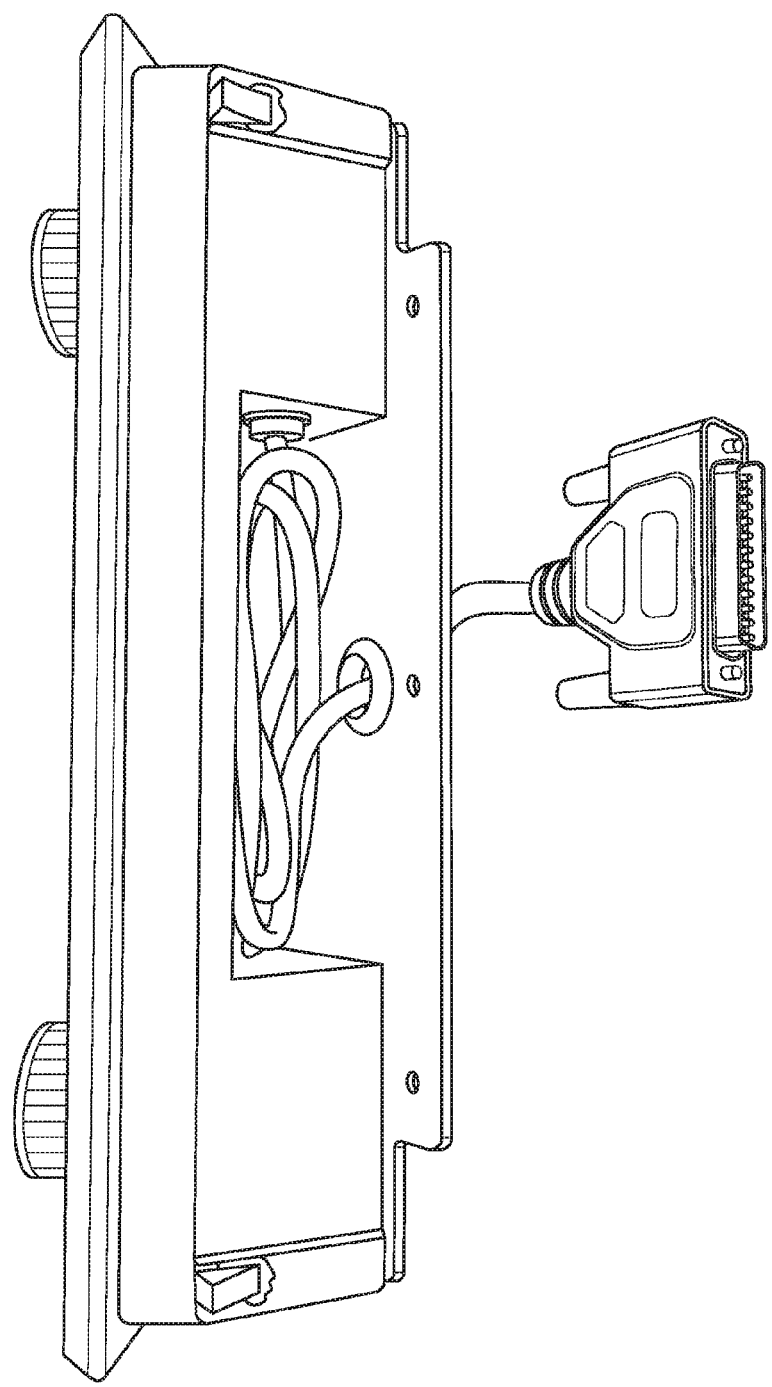
FIG. 16 shows a bottom view picture of a second embodiment of a control panel with the wire and plug for plugging into a cooktop in accordance with certain aspects of the present disclosure.
Figure 17:
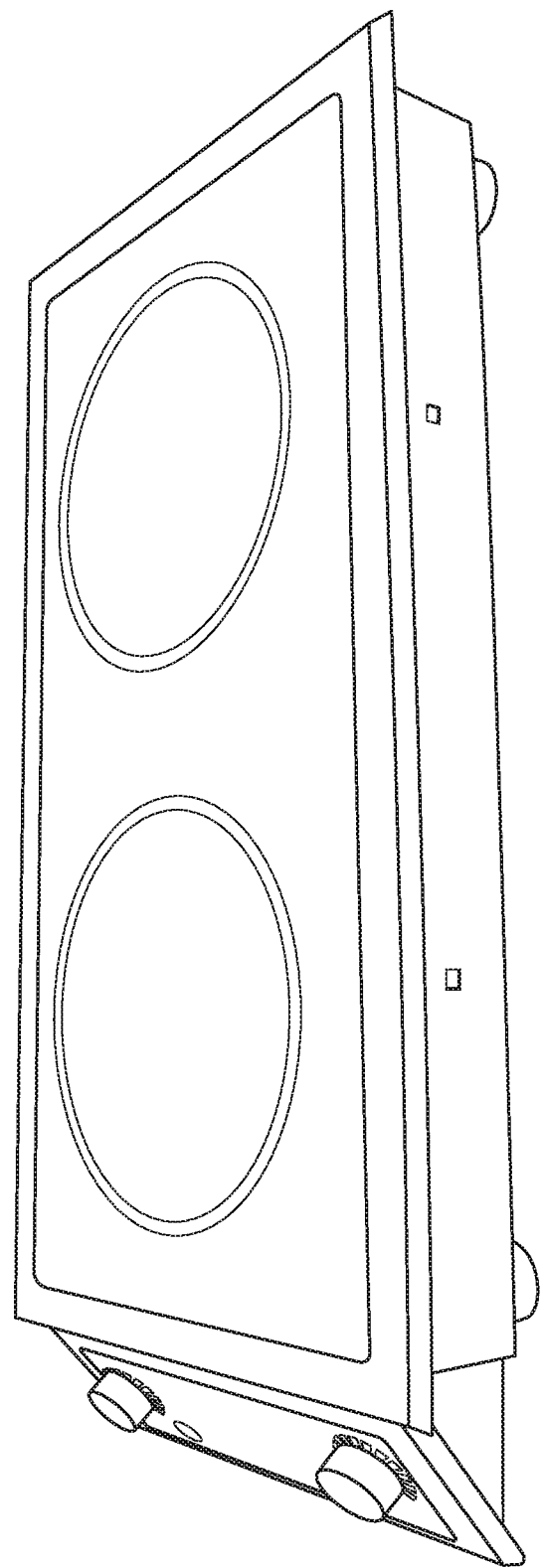
FIG. 17 shows a side view picture of a second embodiment of an induction cooktop with front-back warmers in accordance with certain aspects of the present disclosure.
Figure 18:
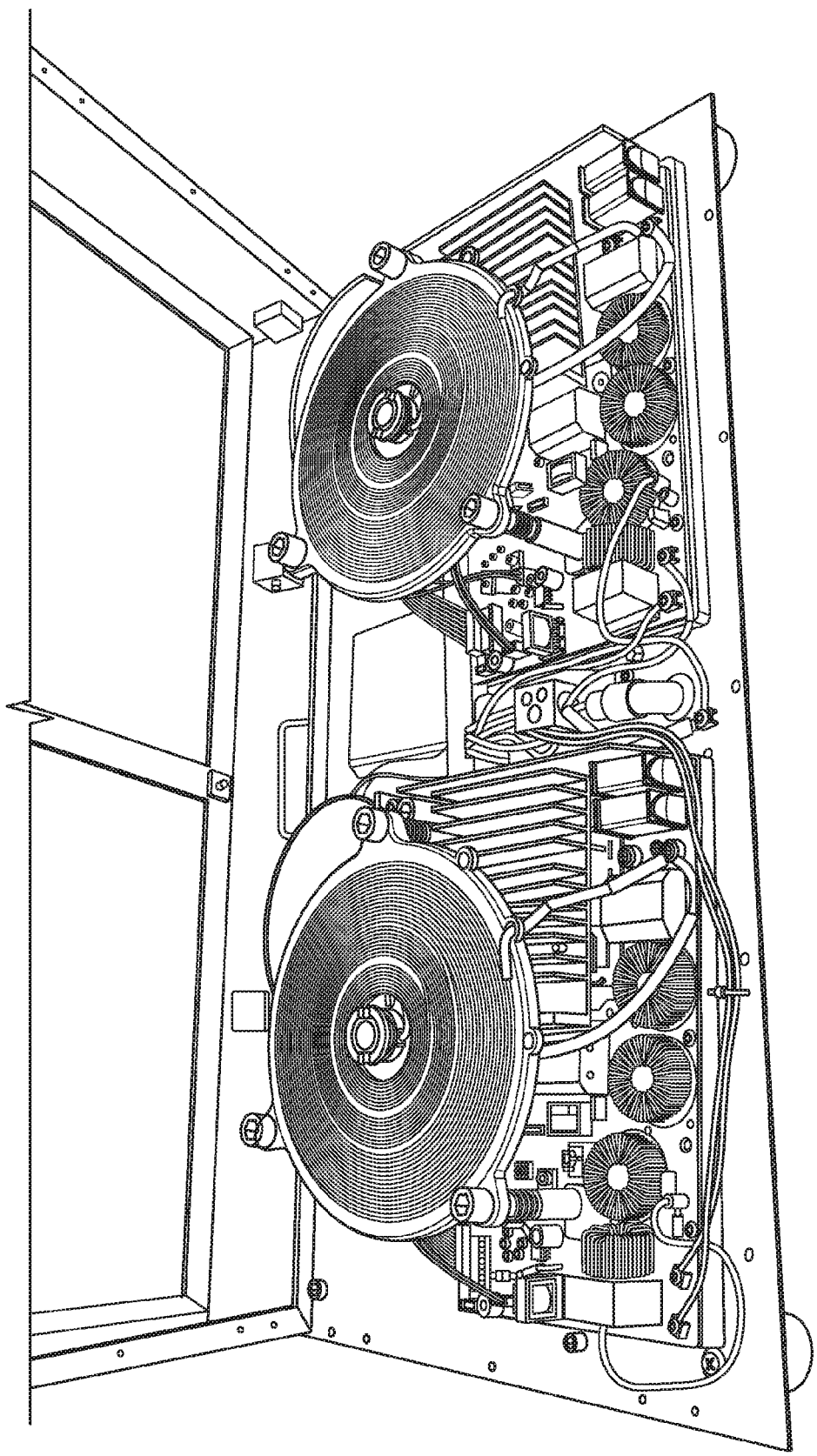
FIG. 18 shows an inside view picture of an induction cooktop with heating coils in accordance with certain aspects of the present disclosure.

FIG. 3 illustrates a perspective view of an induction cooktop with side-by-side warmers in accordance with at least one aspect of the present disclosure. While cooktop 301 is shown in the side-by-side configuration, cooktop 301 may also be in the front-back configuration by reconfiguring control box 305 with respect to warmers 303 through the method discussed above.

Cooktop 301 may be used as both countertop and/or built-in models. To facilitate the use of cooktop 301 as both a countertop and built-in unit, ledge 307 may be prominent enough to act as a stop as it is dropped into a countertop. Ledge 307 may also not be so prominent as to interfere with the use of cooktop 301 as a countertop unit.

Because cooktops 101, 201, and 301 may be seamlessly reconfigured into four different options (built-in side-by-side, built-in front-back, countertop side-by-side, and countertop front-back), manufacturers of these cooktops may have to maintain only one toolset and one SKU for the manufacture of all four models. This reduction in manufacturing complexity may result in lower manufacturing costs for induction cooktops.

While illustrative apparatuses and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A cooktop comprising:
    a housing configured to house no more than two warmers comprising a first warmer and a second warmer;
    the first warmer and the second warmer configured to warm items placed on top of the warmers, wherein the first warmer and the second warmer are arranged in a first configuration or a second configuration, wherein the first configuration comprises the first warmer and the second warmer arranged in a side-by-side fashion in relation to a fastening location of a control panel at a first side of the housing and the second configuration comprises the first warmer and the second warmer arranged in a front-to-back fashion in relation to a fastening location of the control panel at a second side of the housing; and
    the control panel configured to supply power to the first warmer and the second warmer, wherein the control panel is detachably fastened to the first side of the housing in the first configuration and wherein the control panel is detachably fastened to the second side of the housing in the second configuration.

2. The cooktop of claim 1, wherein a cover panel is configured to be detachably fastened to the housing at a location where the control panel is detached.

3. The cooktop of claim 1, further comprising a means for fastening the control panel to the housing.

4. The cooktop of claim 3, wherein the means for fastening includes one of an adhesive and a screw.

5. The cooktop of claim 1, wherein the first side of the housing is a long side of the housing and the second side of the housing is a short side of the housing.

6. The cooktop of claim 1, wherein the housing includes a ledge configured to stop the housing as the housing is dropped into a countertop.

7. The cooktop of claim 6, wherein the ledge is not prominent so that the ledge does not interfere with use of the cooktop as a countertop unit.

8. The cooktop of claim 1, wherein the first warmer and the second warmer are one of: circular-shaped, rectangular-shaped, and triangular-shaped.

9. The cooktop of claim 1, wherein the control panel includes a display of temperature associated with the first warmer and the second warmer.

10. The cooktop of claim 1, wherein the control panel includes a display of a date and time.

11. The cooktop of claim 1, wherein the control panel includes a display of a power level applied to the first warmer and a power level applied to the second warmer.

12. A configurable cooktop comprising:
a control panel detachably fastened at one of a first mounting position on a first side of a housing or a second mounting position on a second side of the housing, wherein a cover plate is detachably fastened at a remaining one of the first mounting position and the second mounting position;
the housing configured to house no more than two warmers comprising a first warmer and a second warmer, wherein the first warmer and the second warmer are arranged in a first configuration when arranged in a side-by-side fashion in relation to the control panel being detachably fastened at the first mounting position; and
the second mounting position on the second side of the housing, wherein the first warmer and the second warmer are arranged in a second configuration when arranged in a front-back fashion in relation to the control panel being detachably fastened at the second mounting position, wherein the cooktop is configured to be used as a built-in side-by-side warmer model, a built-in front-back warmer model, a countertop side-by-side warmer model, and a countertop front-back warmer model based on whether the control panel is fastened at the first mounting position or the second mounting position.

* * * * *